United States Patent [19]
Kondo

[11] Patent Number: 5,214,547
[45] Date of Patent: May 25, 1993

[54] TAPE CASSETTE HAVING REELS DISPLACEABLE TOWARDS THE REAR

[75] Inventor: Yoshio Kondo, Tokyo, Japan

[73] Assignee: Sony Corporation, Tokyo, Japan

[21] Appl. No.: 675,157

[22] Filed: Mar. 26, 1991

[30] Foreign Application Priority Data

Mar. 30, 1990 [JP] Japan ................... 2-084305

[51] Int. Cl.$^5$ .................. G11B 15/00; G11B 5/008; G11B 23/02
[52] U.S. Cl. ................... 360/94; 360/132; 360/84; 360/85; 242/199
[58] Field of Search .......... 360/132, 84, 85, 95, 360/130.22, 94, 137; 242/198-199

[56] References Cited

U.S. PATENT DOCUMENTS

| | | | |
|---|---|---|---|
| 3,610,552 | 10/1971 | Shirakura | 360/94 |
| 4,453,683 | 6/1984 | Reimer et al. | 242/199 |
| 4,703,384 | 10/1987 | Kawada et al. | 360/94 |
| 4,807,077 | 2/1989 | Zaitsu et al. | 360/95 |
| 4,899,236 | 2/1990 | Edakubo et al. | 360/95 |
| 4,984,109 | 1/1991 | Yokoo | 360/94 |

FOREIGN PATENT DOCUMENTS

| | | | |
|---|---|---|---|
| 0077876 | 5/1983 | European Pat. Off. | 360/94 |
| 0153137 | 2/1985 | European Pat. Off. | |
| 3234854 | 5/1983 | Fed. Rep. of Germany | 360/94 |
| 60-205885 | 10/1985 | Japan | 360/94 |
| 2148481 | 6/1990 | Japan | 360/94 |
| 1518834 | 9/1975 | United Kingdom | |

Primary Examiner—John H. Wolff
Assistant Examiner—Alfonso Garcia
Attorney, Agent, or Firm—Lewis H. Eslinger; Jay H. Maioli

[57] ABSTRACT

A tape cassette include a housing and a pair of reels for rotation and translation in the housing so that the reels can assume either of first and second relative positions. A recording tape is wound on the reels and extends therebetween for transport from one of the reels to the other. The housing is formed with an opening through which a transducer can gain access to the recording tape for recording or reproducing signals on or from the recording tape. The reels in the first relative position conform to a first arrangement of a drive for driving the reels in rotation and afford a predetermined amount of space for accommodating a transducer within the housing for access to the recording tape and in the second relative position conform to a second arrangement of a drive for driving the reels in rotation and afford an additional amount of space for accommodating the transducer within the housing for access to the recording tape.

13 Claims, 7 Drawing Sheets

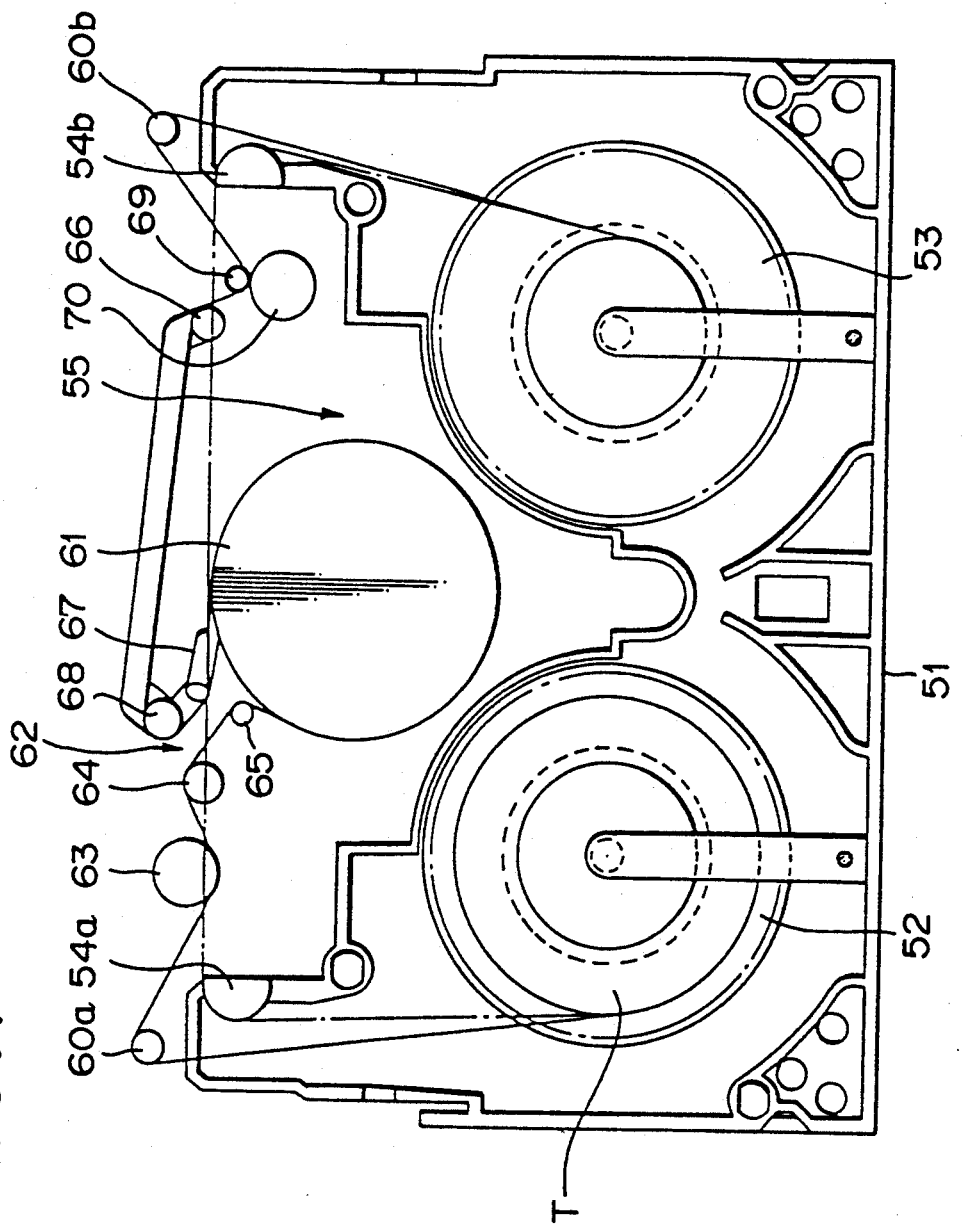

TAPE CASSETTE HAVING REELS DISPLACEABLE TOWARDS THE REAR

BACKGROUND OF THE INVENTION

1. Field of the Invention

The present invention relates to tape cassettes and more particularly to a novel and highly effective tape cassette for use in a magnetic recording and reproducing device such as a videotape recorder, the tape cassette having a tape wound in coils of small diameter so that a magnetic recording and reproducing device that employs the tape cassette may be of a reduced size.

2. Description of the Prior Art

There have been proposed tape cassettes for use in magnetic recording and reproducing devices such as video tape recorders (VTRs), the tape cassettes being designed particularly for recording information during a relatively short period of time. The proposed tape cassettes have a cassette housing that accommodates a magnetic tape wound in coils of small diameter, thereby enlarging a mouth in which a head drum and related portions of a cassette player can be partially inserted, so that the magnetic recording and reproducing device may be reduced in size. Reference should be made to Japanese laid-open patent publication No. 60(1985)-171684 and Japanese utility model application No. 62(1987)-14573 filed by the assignee of the present application.

One such tape cassette for recording information during a relatively short period of time is schematically shown in FIG. 7 of the accompanying drawings. In FIG. 7, the tape cassette has a cassette housing 51 accommodating a pair of rotatable tape reels 52, 53 with a magnetic tape T wound therearound. The magnetic tape T has a portion unreeled from the tape reels 52, 53 and guided by semicylindrical guides 54a, 54b disposed in spaced positions at the front of the cassette housing 51, the unreeled tape portion being kept taut and exposed in a front opening in the cassette housing 51. The cassette housing 51 has a mouth (opening) 55 formed in a lower panel of the cassette housing 51 between and somewhat forward of the tape reels 52, 53.

The diameter of the tape reels 52, 53 is smaller than the reel diameter of a conventional, standard tape cassette, and therefore the mouth 55 is correspondingly larger.

When the tape cassette is in use, the magnetic tape T is withdrawn forwardly from the cassette housing 51 by tape withdrawal guides 60a, 60b in the magnetic recording and reproducing device, and a head drum 61 and various tape transport members 62 including an impedance roller 63, tape guides 64, 65, 66, loading posts 67, 68, a capstan 69, and a pinch roller 70 are inserted to the extent feasible into the mouth 55. The magnetic tape T is now wound or loaded around the head drum 61 for recording or reproducing signals on or from the magnetic tape T.

Since the tape reels 52, 53 are smaller in diameter and the mouth 55 is correspondingly larger than in earlier tape cassettes of the same general construction, the head drum 61 and the tape transport members 62 can be inserted deeply into the cassette housing 51. As a result, the magnetic recording and reproducing device may be made small.

However, the increase in the size of the mouth is slight since only the diameter of the tape reels is reduced in the conventional tape cassette for recording information during a relatively short period of time. This limits efforts to reduce the size of the magnetic recording and reproducing devices.

In a conventional tape cassette, the cassette housing contains unused space to the rear of the tape reels; the space in the cassette housing of the conventional tape cassette is thus not effectively utilized.

OBJECTS AND SUMMARY OF THE INVENTION

In view of the drawbacks of the conventional tape cassette outlined above, it is an object of the present invention to provide a tape cassette that includes a cassette housing whose internal space is more effectively utilized to define an enlarged mouth in the cassette housing.

Another object of the invention is to provide a new type of tape cassette that can be used in cooperation with a conventional recording/reproducing apparatus and that is also compatible with a new type of recording/reproducing apparatus dedicated to use the new type of tape cassette.

A particular object of the invention is to provide an 8-mm tape cassette that has an interior construction that makes it possible to reduce the size of a camcorder with which it cooperates.

The foregoing and other objects of the invention are attained by the provision of a tape cassette comprising: housing means; a pair of reels; means mounting both of the reels for rotation and at least one of the reels for translation in the housing means, so that the reels can assume either of first and second relative positions; and a recording medium wound on the reels and extending therebetween for transport from one of the reels to the other; the housing means being formed with an opening through which transducer means can gain access to the recording medium for recording or reproducing signals on or from the recording medium; and the reels in the first relative position conforming to a first arrangement of drive means for driving the reels in rotation and affording a predetermined amount of space for accommodating transducer means within the housing means for access to the recording medium and in the second relative position conforming to a second arrangement of drive means for driving the reels in rotation and affording an additional amount of space for accommodating transducer means within the housing means for access to the recording medium.

In accordance with an independent aspect of the invention, an 8-mm tape cassette is provided comprising: housing means having at least a rear wall; first and second reels; means mounting the reels for rotation in the housing means about respective first and second axes; and a recording medium wound on the reels and extending therebetween for transport from one of the reels to the other; the housing means being formed with an opening through which transducer means can gain access to the recording medium for recording or reproducing signals on or from the recording medium; and the housing means having the shape of a rectangular paralellepiped measuring substantially 95 mm × 63 mm × 15 mm, at least one of the axes being less than 26 mm from the rear wall, thereby affording, as compared to a standard 8-mm tape cassette having a rear wall and reels with respective axis each substantially 26 mm therefrom, an additional amount of space for accommodating transducer means within the housing means for access to the recording medium.

In accordance with another independent aspect of the invention, a tape cassette is provided having a front-to-back direction and a left-to-right direction and comprising: housing means; and a pair of reels; the housing means being formed with a pair of reel shaft insertion holes spaced apart in the left-to-right direction and respectively cooperating with the reels, at least one of the reel shaft insertion holes being elongate in a direction having a component parallel to the front-to-back direction, thereby facilitating repositioning of at least one of the reels in a direction having a component parallel to the front-to-back direction.

In accordance with another independent aspect of the invention, there is provided a tape cassette comprising: housing means; a pair of reels; means mounting both of the reels for rotation and at least one of the reels for translation in the housing means, so that the reels can assume either of first and second relative positions; and a recording medium wound on the reels and extending therebetween for transport from one of the reels to the other; the housing means being formed with an opening through which transducer means can gain access to the recording medium for recording or reproducing signals on or from the recording medium; and the tape cassette being formed with tape detection means facilitating detection of starting and finishing portions of the recording medium.

The connection between the lid and the cassette housing need not be a pivoting connection, although a pivoting connection is preferred.

It is also not necessary that the lid open upwardly and the downward opening force be applied at a point to the rear of the pivot. Alternatively, the lid may opened by being pivoted downwardly, and the opening force may be applied to the lid at a position forward of the pivot.

When the tape cassette according to the present invention in its preferred embodiment is in its "normal" condition, the tape reels are in the same position as the tape reels of a conventional standard tape cassette, and the mouth is relatively small. The tape cassette is then compatible with a conventional cassette player. When the tape cassette is in use in a cassette player of a new design as disclosed herein and broadly claimed in co-pending application of Yoshio Kondo and Kenichi Fukahori, Ser. No. 674,977 filed concurrently herewith, assigned to the assignee of the present invention, and entitled "Magnetic Recording and Reproducing Device," the tape reels are moved or retracted parallel to each other rearwardly in the cassette housing, thereby enlarging the mouth. Thus, a head drum and other members can be inserted more deeply into the cassette housing. As a consequence, the recording and reproducing device which employs the tape cassette may be of a smaller size than has heretofore been achievable.

Other objects, features and advantages of the invention will become apparent from a consideration of the following detailed description of the preferred embodiment of the invention, in conjunction with the appended figures of the drawing, wherein a given reference character always represents the same element or part.

BRIEF DESCRIPTION OF THE DRAWING

FIG. 7 is a top plan view of a conventional tape cassette.

DESCRIPTION OF THE PREFERRED EMBODIMENTS

Figure 1:
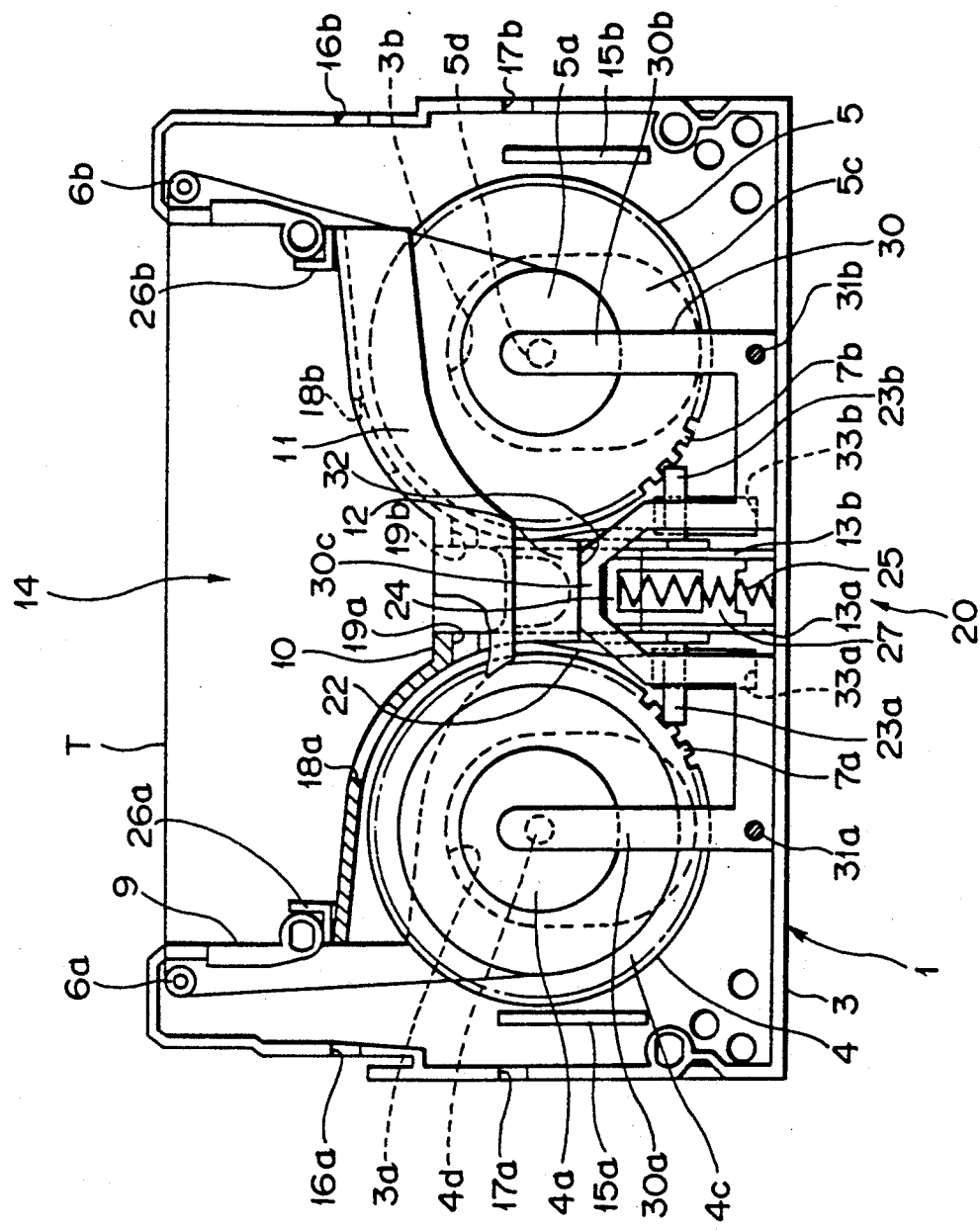
FIG. 1 is a plan view of a tape cassette according to the present invention, an upper housing portion of the tape cassette being omitted for clarity, the tape cassette being in a "normal" state in which it is capable of cooperating with a standard cassette player, and the tape reels being locked against rotation.

An embodiment of the present invention will hereinafter be described in detail with reference to FIGS. 1 through 5, 6A and 6B.

A tape cassette according to the present invention has a cassette housing 1 comprising an upper portion 2 and a lower portion 3 that are joined together in any conventional manner, for example by screws.

The cassette housing 1 has an outer configuration and dimensions according to the internationally agreed-upon 8-mm video standards. The cassette housing 1 is thus in the shape of a rectangular parallelepiped measuring approximately 95 mm×63 mm×15 mm.

The cassette housing 1 accommodates therein a pair of tape reels 4, 5 with a magnetic tape T wound therearound. The tape reels 4, 5 are rotatably positioned over respective reel shaft insertion holes 3a, 3b which are formed in a bottom panel of the lower portion 3 of the cassette housing 1. The magnetic tape T has a portion unreeled from the tape reels 4, 5 and guided by roller guides 6a, 6b disposed in spaced positions at the front of the lower housing portion 3. The unreeled portion of the tape is kept taut and can be exposed in a front opening formed in the cassette housing 1.

The tape reels 4, 5 have respective hubs 4a, 5a around which the magnetic tape T is wound, and respective pairs of upper and lower flanges 4b, 4c and 5b, 5c for guiding upper and lower edges of the tape T around the hubs 4a, 5a and maintaining the upper and lower edges of the tape coils in a smooth, flat condition. The lower flanges 4c, 5c have engaging teeth 7a, 7b formed around their outer circumferential edges, the engaging teeth 7a, 7b being engageable by lock members (described later on). The upper and lower tape reel flanges 4b, 4c and 5b, 5c of the tape reels 4, 5 have a diameter smaller than that of tape reel flanges of a standard tape cassette. Therefore, the magnetic tape T wound around the tape reels 4, 5 is shorter than the magnetic tape in a standard tape cassette. For example, the magnetic tape T can record or reproduce information during a period of time ranging from 30 to 60 minutes.

The tape reels 4, 5 are movable in translation in the cassette housing 1 between a normal position which is determined by the 8-mm video standards and a retracted position near the rear wall of the cassette housing 1.

A mechanism enabling movement of the tape reels 4, 5 between the normal and retracted positions in the tape cassette 1 is constructed as follows:

The upper panel of the upper housing portion 2 and the lower panel of the lower housing portion 3 have respective recesses 8, 9 formed therein behind the stretch of the magnetic tape T between the roller guides 6a, 6b. The tape reels 4, 5 can be moved by a reel-moving member 10 disposed in the cassette housing 1 and partly covering the recesses 8, 9. The reel-moving member 10 comprises a reel holder 11 covering front portions of the tape reels 4, 5, and a guide 12 extending continuously rearwardly from the center of the reel holder 11. The reel holder 11 has a channel-shaped cross section for holding the tape reels 4, 5 between upper and lower horizontal plates thereof. The guide 12 is of a portal shape as viewed from the front or rear of the reel holder 11, and has laterally spaced vertical plates respectively lying along outer side surfaces of parallel guide walls 13a, 13b. The guide walls 13a, 13b are vertically disposed on the central region of the lower panel of the lower housing portion 3. When the guide 12 is guided along the parallel guide walls 13a, 13b, the reel moving-member 10 is moved back and forth transversely (i.e., front-to-back) with respect to the cassette housing 1.

The cavity or space defined in front of the reel-moving member 10 serves as a mouth 14 for inserting therein a head drum and other members when signals are to be recorded on or reproduced from the magnetic tape T. When the reel-moving member 10 is guided along the parallel guide walls 13a, 13b of the lower housing portion 3, the tape reels 4, 5 are moved by the reel-moving member 10, thereby varying the size of the mouth 14.

To allow the tape reels 4, 5 to move parallel to each other back and forth in the cassette housing 1, the reel shaft insertion holes 3a, 3b of the lower housing portion 3 are elongate in the back-and-forth direction (front-to-back or transverse direction) of the cassette housing 1. The lower panel of the lower housing portion 3 has limit walls 15a, 15b for limiting lateral movement of the tape reels 4, 5.

The lower housing portion 3 has laterally spaced side walls each having recesses which, in combination with the laterally spaced side walls of the upper housing portion 2, define through-holes 16a, 16b and 17a, 17b. The reel-moving member 10 also has through-holes 18a, 18b and 19a, 19b defined in a front portion of the reel holder 11 and a front end of the guide 12. These through-holes 16a, 16b, 17a, 17b, 18a, 18b, 19a, 19b serve to pass therethrough beams of light for detecting the starting and finishing ends of the magnetic tape T during recording and reproducing. The through-holes 16a, 16b and 18a, 18b are used to pass detecting beams of light when the tape cassette is employed in a magnetic recording and reproducing device according to the 8-mm video standards, while the through-holes 17a, 17b and 19a, 19b are used to pass detecting beams of light when the tape cassette is employed in a magnetic recording and reproducing device dedicated to use in combination with the tape cassette according to the invention.

The cassette housing 1 also houses in its rear portion a lock mechanism 20 for locking the tape reels 4, 5 against rotation when the tape cassette is not in use. The lock mechanism 20 is constructed as follows:

The guide 12 of the reel-moving member 10 has a recess 21 defined in a pair of laterally spaced vertical side walls thereof and extending over a certain length. The lock mechanism 20 has a lock member 22 mounted for movement along the outer side surfaces of the parallel guide walls 13a, 13b. The lock member 22 is freely movable with respect to the reel-moving member 10 within a predetermined range which extends between front and rear vertical edges of the recess 21. The lock member 22 has a pair of locking arms 23a, 23b projecting in opposite, left-to-right directions from respective side walls thereof for engaging the engaging teeth 7a, 7b of the tape reels 4, 5.

The lock member 22 also has a spring retainer 24 disposed on the upper surface of its upper panel. A compression coil spring 25 is disposed under compression between the spring retainer 24 and the rear side wall of the cassette housing 1, for normally urging the lock member 22 in a forward direction to hold the locking arms 23a, 23b in locking engagement with the engaging teeth 7a, 7b of the tape reels 4, 5. The lock member 22 thus biased forwardly by the compression coil spring 25 abuts against the front vertical edge of the recess 21 of the reel-moving member 10, thereby urging the reel-moving member 10 in a forward direction to bring the laterally spaced opposite ends of the front surface of the reel holder 11 into abutment with respective stops 26a, 26b which are located at laterally spaced positions in a front portion of the lower housing portion 3.

Figure 5:
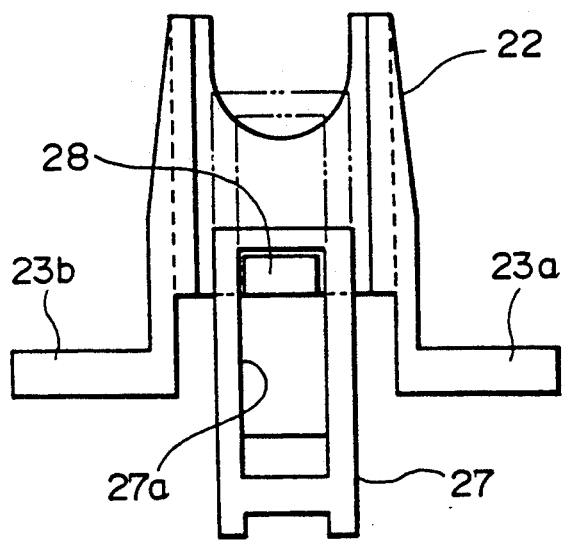
FIG. 5 is a bottom plan view of a lock member and an unlock block as they coact with each other.

An unlock block 27 for unlocking the tape reels 4, 5 for rotation is positioned between the parallel guide walls 13a, 13b underneath the lock member 22. The unlock block 27 has an oblong hole 27a defined in its upper surface and extending transversely (i.e., front-to-back) with respect to the cassette housing 1. The oblong hole 27a receives therein a post 28 projecting downwardly from a lower surface of the upper panel of the lock member 22. Therefore, the unlock block 27 is movable with respect to the lock member 22 in a range corresponding to the distance between the front and rear ends of the oblong hole 27a with which the post 28 is engageable, as shown in FIG. 5.

The lower panel of the lower housing portion 3 has an insertion hole 29 in register with the oblong hole 27a of the unlock block 27. When the tape cassette is loaded in a magnetic recording and reproducing device, as described later on, an actuating member is inserted from the magnetic recording and reproducing device through the insertion hole 29 into the oblong hole 27a of the unlock block 27 to displace the lock member 22 out of locking engagement with the tape reels 4, 5.

A reel presser spring 30 is fixed to the lower surface of the upper panel of the upper housing portion 2 by laterally spaced pins 31a, 31b. The reel presser spring 30 presses against the tops of the tape reels 4, 5 to prevent undesired wobbling or rattling movement and also to lock the reel-moving member 10 against undesired movement. More specifically, the reel presser spring 30 comprises a pair of resilient reel presser arms 30a, 30b for pressing the tape reels 4, 5, respectively, and a resilient lock member 30c for locking the reel-moving member 10. The reel presser arms 30a, 30b extend linearly along the paths (in translation) that are followed by the tape reels 4, 5 during movement between the normal and retracted positions. The presser arms 30a, 30b have distal ends bent slightly downwardly toward the lower housing portion 3. The bent distal ends of the reel presser arms 30a, 30b are resiliently pressed against respective central projections 4d, 5d of the tape reels 4, 5 to prevent the tape reels 4, 5 from wobbling or rattling. The reel-moving member 10 has an engaging step 32 on the upper surface of the guide 12 thereof. The resilient lock member 30c has a distal end for normally engaging the engaging step 32 of the reel moving member 10 to lock the reel-moving member 10 against rearward movement. The front surface of the reel-moving member 10 is then held in abutment against the respective stops 26a, 26b of the lower housing portion 3.

The lower panel of the lower housing portion 3 also has a pair of insertion holes 33a, 33b, one on each side of the parallel guide walls 13a, 13b, below the resilient lock member 30c of the reel presser spring 30. When the tape cassette is loaded in the dedicated magnetic recording and reproducing device, an actuating member 44 (FIG. 4) is inserted from the magnetic recording and reproducing device through the insertion holes 33a, 33b into the cassette housing 1 to displace the resilient lock member 30c out of locking engagement with the reel-moving member 10, which is then released.

A front lid 34 is mounted for pivoting movement on the front end of the cassette housing 1 to selectively open and close the front opening of the cassette housing 1. When the front opening of the cassette housing 1 is closed by the front lid 34, the front lid 34 protects the face of the magnetic tape T which extends under tension between the roller guides 6a, 6b.

The front lid 34 has laterally spaced side walls 34a, 34b extending perpendicularly from the opposite ends of the front lid 34. The side walls 34a, 34b have respective horizontal shafts 35a, 35b projecting toward each other from inner surfaces thereof and received in respective holes 36 (only one of which is visible in FIG. 4) defined by recesses in the front ends of opposite side walls of the upper housing portion 2 in combination with front ends of opposite side walls of the lower housing portion 3. Therefore, the front lid 34 is angularly movable in a vertical plane about the shafts 35 with respect to the cassette housing 1. The front lid 34 is normally urged to turn in a closing direction to cover the face of the magnetic tape T by a torsion spring 37 coiled around one of the shafts 35. Upon loading the tape cassette in either the standard or the dedicated magnetic recording and reproducing device, the front lid 34 is turned upwardly by a lid opening mechanism in the magnetic recording and reproducing device, thereby exposing the magnetic tape T between the roller guides 6a, 6b.

A back lid 38 for protecting the back of the magnetic tape T between the roller guides 6a, 6b is disposed behind the front lid 34.

The back lid 38 has shafts 39 (only one of which is visible in FIG. 4) on respective opposite side edges thereof. The shafts 39 are pivotably supported by respective supports 40a, 40b that project from the rear surface of the front lid 34. The back lid 38 is thus coupled to the front lid 34 for pivotal movement with respect thereto. The back lid 38 also has engaging pins 41 (only one of which is visible in FIG. 4) projecting from respective opposite ends thereof. The engaging pins 41 are movably received in respective cam grooves 43a, 43b respectively formed in the inner surfaces of vertical walls 42a, 42b, which are located in laterally spaced positions towards the front of the lower housing portion 3. When the front lid 34 is opened or closed with respect to the cassette housing 1, the engaging pins 41 are guided by and along the cam grooves 43a, 43b to cause the back lid 38 to be opened or closed with respect to the front lid 34 in coordination with the movement of the front lid 34.

Figure 6A:
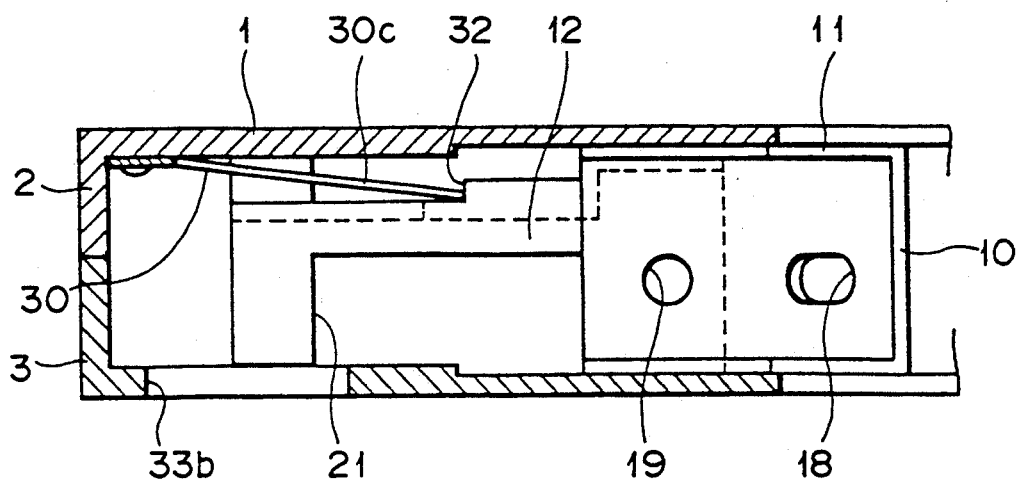
FIGS. 6A and 6B are cross-sectional views in a vertical plane parallel to the front-to-back direction of the tape cassette showing the manner in which a reel-moving member is locked (FIG. 6A) and unlocked (FIG. 6B)

The tape cassette thus constructed operates as follows:

Normally, the reel-moving member 10 is locked in its foremost (forward) position by the resilient lock member 30c of the reel presser spring 30, as FIG. 6A shows. The lock member 22 is displaced forwardly under the bias of the compression coil spring 25, keeping the locking arms 23a, 23b in locking engagement with the teeth 7a, 7b of the tape reels 4, 5, respectively, and pressing the tape reels 4, 5 forwardly. The tape reels 4, 5 are therefore locked against rotation in respective positions that conform to the 8-mm video standards, as shown in FIG. 1.

Since the tape reels 4, 5 are normally in the predetermined positions according to the 8-mm video standards, the tape cassette can compatibly be used in the same manner as a conventional 8-mm videotape cassette without the use of any adapter.

Figure 2:
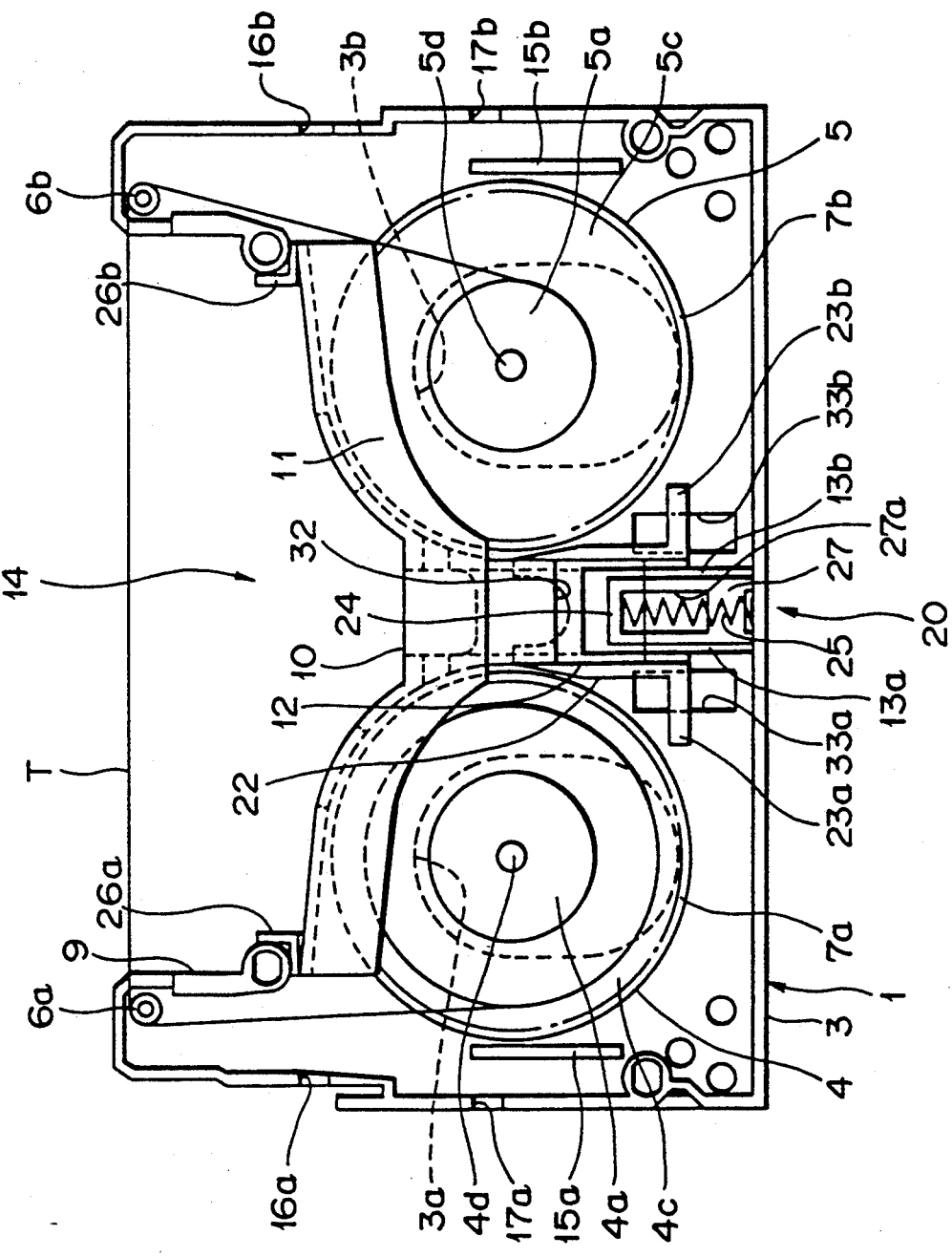
FIG. 2 is a view similar to FIG. 1, but showing the tape reels unlocked so that they can rotate.

When the tape cassette is loaded into a standard magnetic recording and reproducing device designed according to the 8-mm video standards, an actuating member (not shown) is inserted from the magnetic recording and reproducing device through the insertion hole 29 into the oblong hole 27a of the unlock block 27, thereby retracting the unlock block 27 toward the rear wall of the lower housing portion 3. Through its interaction with the post 28, the retraction of the unlock block 27 causes the lock member 22 to be also retracted. The locking arms 23a, 23b of the lock member 22 are therefore displaced out of locking engagement with the teeth 7a, 7b of the tape reels 4, 5, which are now unlocked for rotation, as FIG. 2 shows.

In the operation described above, the lock member 22 is movable only through a distance related to the length of the recess 21 of the reel-moving member 10. The reel-moving member 10 remains locked by the reel presser spring 30. Accordingly, the tape reels 4, 5 are unlocked for rotation, but stay in the positions conforming to the 8-mm video standards.

When the tape cassette is loaded into a dedicated magnetic recording and reproducing device as disclosed in the copending application identified above, the reel-moving member 10 is unlocked and moved by the actuating member 44 (FIG. 4) in the dedicated magnetic recording and reproducing device.

Figure 6B:
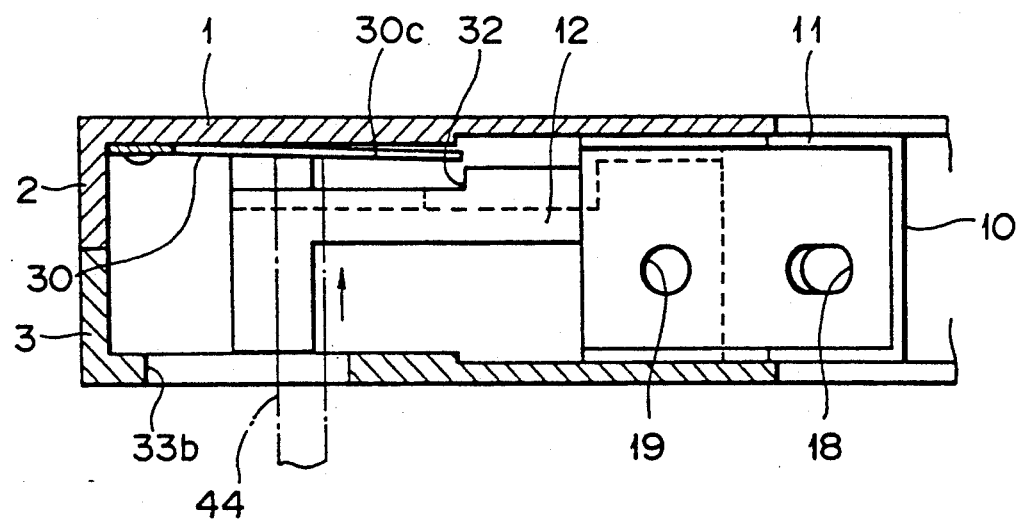

More specifically, the actuating member 44 has two actuating fingers 44a, 44b which are inserted through the respective insertion holes 33a, 33b into the cassette housing 1 to press the resilient lock member 30c upwardly toward the upper panel of the upper housing portion 2. The resilient lock member 30c is displaced upwardly out of locking engagement with the engaging step 32 of the reel moving member 10, which is now unlocked, as FIG. 6B shows.

Figure 3:
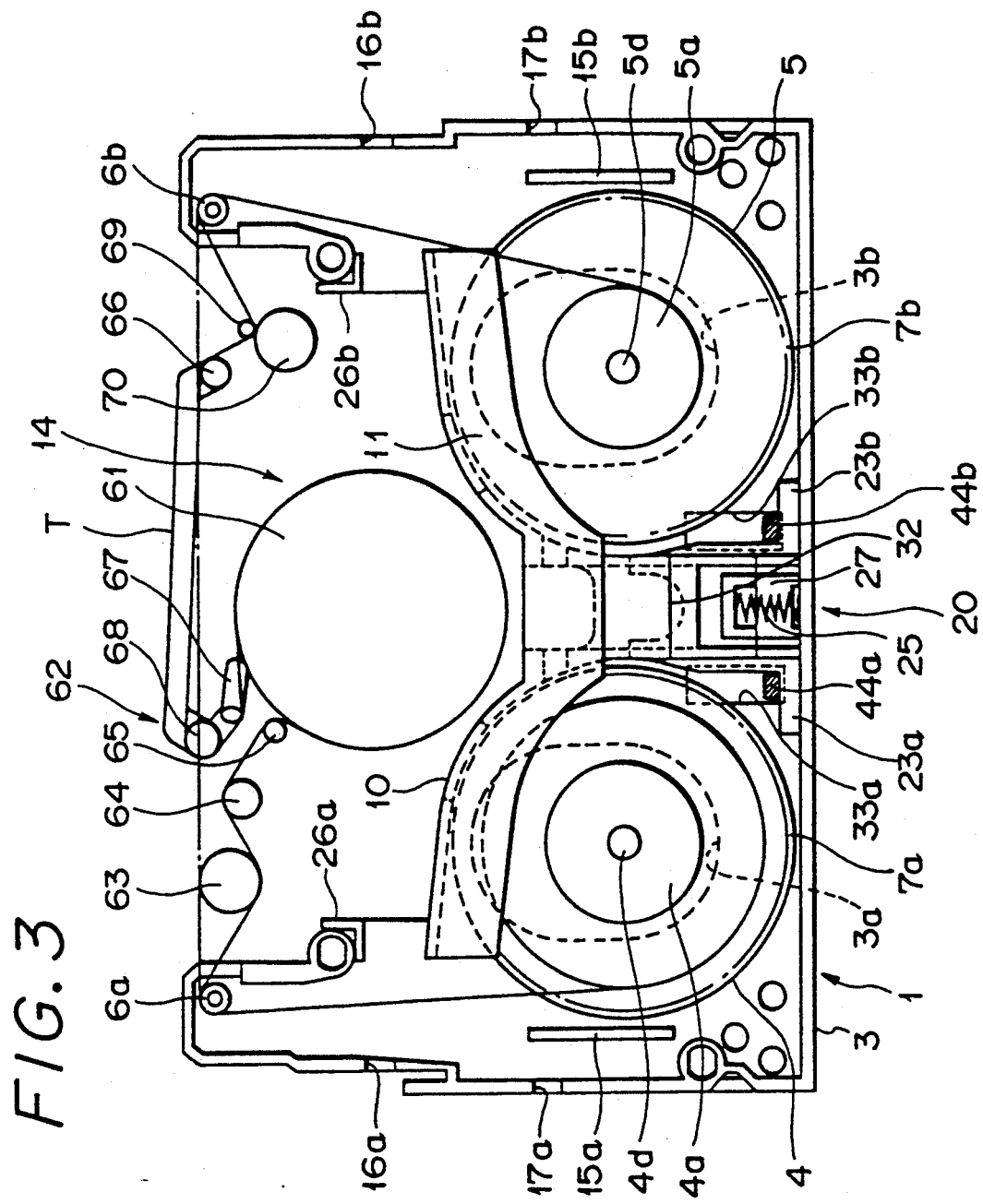
FIG. 3 is a view similar to FIG. 2, but showing the tape cassette in a modified state, in which it is capable of cooperating with a new type of cassette player dedicated for use with a tape cassette constructed in accordance with the present invention.
Figure 4:
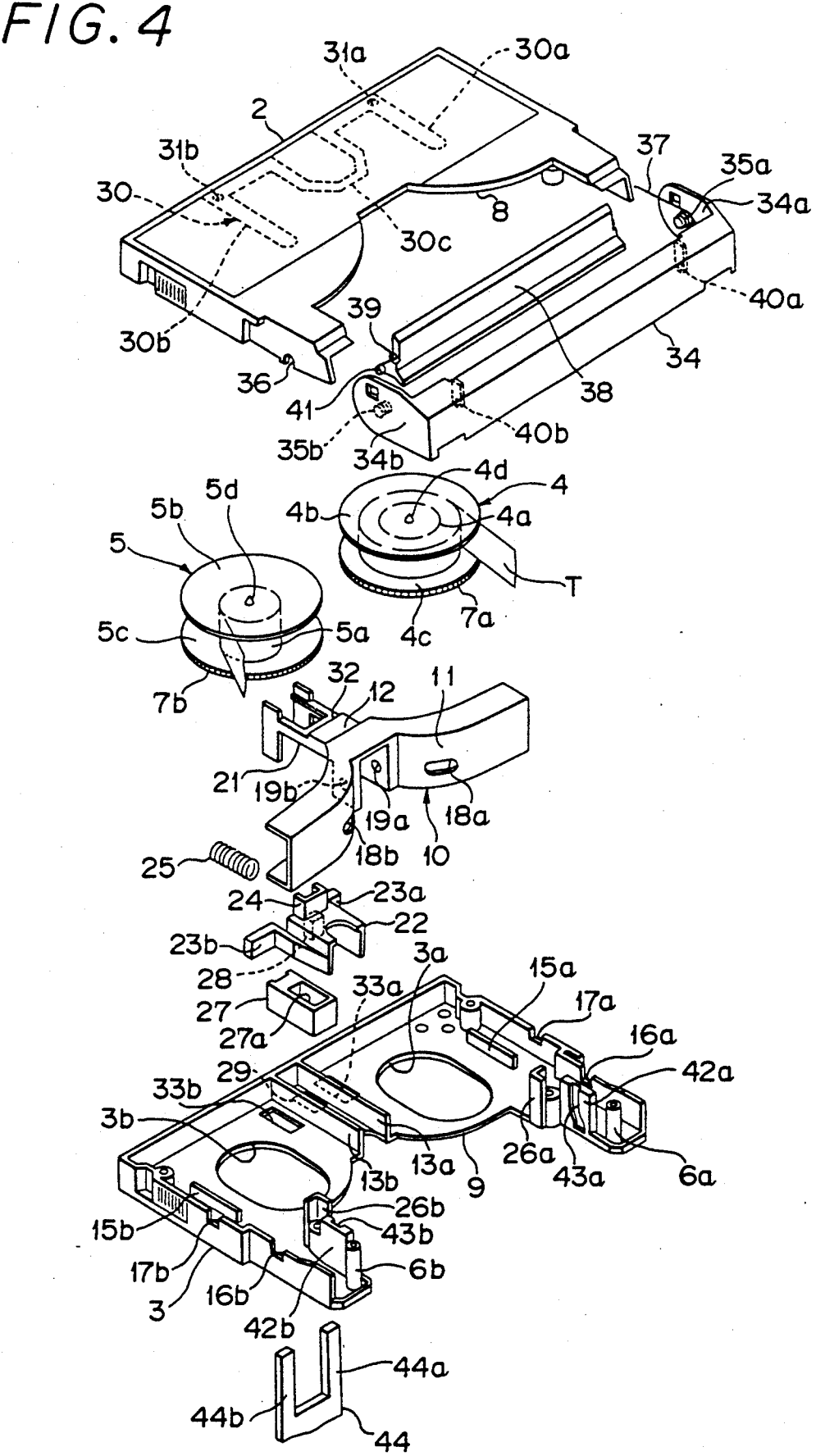
FIG. 4 is an exploded perspective view of the tape cassette.

When the reel-moving member 10 is unlocked, the actuating member 44 is moved rearwardly to enable the actuating fingers 44a, 44b to engage and push the locking arms 23a, 23b of the lock member 22 rearwardly. The lock member 22 is thus retracted through a substantial distance, so that it pushes against the rear edge of the recess 21 of the reel-moving member 10. The reel-moving member 10 is therefore retracted in unison with the lock member 20, whereby the tape reels 4, 5 are moved parallel to each other towards the rear of the cassette housing 1 As a consequence, the mouth 14, whose rear end is defined by the reel-moving member 10, is enlarged as shown in FIG. 3.

Since the unlock block 27 is movably coupled to the lock member 22, when the lock member 22 is retracted as described above, the unlock block 27 moves with it. The lock member 22 can thus smoothly be retracted without being obstructed by the unlock block 27.

Then, a head drum 61 and various tape transport members 62 including an impedance roller 63, tape guides 64, 65, 66, loading posts 67, 68, a capstan 69, and a pinch roller 70 (FIG. 3) of the magnetic recording and reproducing device can be inserted substantially fully into the enlarged mouth 14. Signals can then be recorded on and reproduced from the magnetic tape T in the usual manner by the head drum 61.

More specifically, the tape guides 64, 65, 66, the loading posts 67, 68, and the capstan 69 are mounted on a fixed chassis of the magnetic recording and reproducing device, and are positioned in the mouth 14 when the tape cassette is loaded in the magnetic recording and reproducing device. The head drum 61, the impedance roller 63, and the pinch roller 70 are mounted on a movable plate which is displaceable with respect to the fixed chassis of the magnetic recording and reproducing device. Before the tape cassette is loaded in the magnetic recording and reproducing device, the head drum 61, the impedance roller 63, and the pinch roller 70 are positioned outside of a region which will be occupied by the mouth 14 when the tape cassette is loaded. When the tape cassette is loaded in the magnetic recording and reproducing device, the movable plate is moved to insert the head drum 61, the impedance roller 63, and the pinch roller 70 from the front of the tape cassette into the mouth 14. The magnetic tape T stretched between the roller guides 6a, 6b is drawn by the head drum 61 into the mouth 14 where the magnetic tape T extends along a certain path. At the same time, the loading posts 67, 68 move arcuately around the head drum 61 to wind the magnetic tape T around the head drum 61, whereupon the loading of the magnetic tape T is completed.

Since the mouth 14 is substantially enlarged when a tape cassette constructed in accordance with the present invention is loaded in a magnetic recording and reproducing device dedicated to use the novel tape cassette, the head drum 61 and the tape transport members 62 can be inserted deeply into the cassette housing 1 and substantially fully accommodated in the mouth 14. While signals are being recorded on or reproduced from the magnetic tape T in the tape cassette, the head drum 61 and the tape transport members 62 in the magnetic recording and reproducing device are positioned along with the tape reels 4, 5 within a region which is of substantially the same size as the tape cassette. The dedicated magnetic recording and reproducing device may thus itself be of a miniature size corresponding to the size of the tape cassette, and hence may be rendered more compact than the conventional magnetic recording and reproducing devices.

In addition, the reel-moving member 10 is movably locked against movement merely by a portion of the reel presser spring 30, rather than by a complex lock mechanism. Consequently, the tape cassette according to the present invention is made up of a relatively small number of parts and can be assembled with ease and manufactured at relatively low cost.

While the present invention has been described as being applied to an 8-mm video cassette, the principles of the present invention are also applicable to other tape cassettes for recording and reproducing information using rotary heads, such as a conventional ½-inch video cassette and a tape cassette for use in a DAT (digital audio tape recorder).

The tape cassette according to the present invention is compatible with players for conventional standard tape cassettes, yet has a mouth capable of enlargement to allow the head drum and the tape transport members to be inserted even more deeply into the cassette housing. The magnetic recording and reproducing device which employs the tape cassette according to the present invention may therefore be extremely small.

Many modifications of the preferred embodiment of the invention described above will readily occur to those skilled in the art upon consideration of this disclosure. For example, although it is highly desirable for both of the tape reels to be mounted for translation in the housing, it is not strictly necessary that both be so mounted in order to achieve some of the advantages of the present invention. Even if only one of the reels is movable to the rear, the recording/reproducing head or transducer can in principle be inserted more deeply into the mouth of the cassette by displacing it somewhat towards the side of the reel that is moved to the rear. The important point is simply that the reels be capable of assuming either of first and second relative positions and that the reels in the first relative position conform to a first arrangement of drive means for driving the reels in rotation and afford a predetermined amount of space for accommodating a transducer within the housing for access to the recording medium and in the second relative position conform to a second arrangement of drive means for driving the reels in rotation and afford an additional amount of space for accommodating a transducer within the housing for access to the recording medium.

It is also not essential that the new tape cassette of the present invention be compatible with standard, conventional tape cassette players. That is, it is possible in accordance with the invention to construct a tape cassette which fully conforms to the international standards (for example, the standards applicable to 8-mm tape cassettes) except that the tape reels are permanently "out of position" by being moved towards the rear wall of the tape cassette so that, instead of their centers being distant the normal 26 mm or so from the rear wall, they are less distant than 26 mm, or the center of at least one of the tape reels is distant less than 26 mm, and preferably both reels are approximately 21 mm from the rear wall.

Many other modifications of the preferred embodiment of the invention described above and illustrated in the drawings will readily occur to those skilled in the art. Accordingly, the invention is to be construed as including all embodiments thereof which fall within the scope of the appended claims.

I claim:

1. A tape cassette for a cassette player having a rotary head drum, comprising:
   housing means;
   a pair of reels;
   means mounting both of said reels for rotation and for translation in said housing means, so that said reels can assume either of first and second relative positions; and a recording medium wound on said reels and extending therebetween for transport from one of said reels to the other;

said housing means being formed with an opening through which a rotary head drum of a cassette player can gain access to said recording medium; and a reel-moving member inside said housing means for moving said reels form said first position to said second position upon cooperation with an actuating member of said cassette player;

said reels in said first relative position conforming to a first arrangement of drive means for driving said reels in rotation and providing a predetermined amount of space for accommodating the rotary head drum within said housing means for access to said recording medium and in said second relative position conforming to a second arrangement of drive means for driving said reels in rotation and providing an additional amount of space for accommodating transducer means within said housing means for access to said recording medium.

2. A tape cassette according to claim 1 wherein said mounting means mounts both of said reels for translation in said housing means.

3. A tape cassette according to claim 1 wherein said translation has a component parallel to a front-to-back direction of said housing means.

4. A tape cassette according to claim 1 further comprising detection means formed on said housing means, said detection means cooperating with a cassette player employing either of said first and second arrangements of drive means for detecting the arrangement of drive means employed; and lock means operatively associated with said detection means for maintaining said first relative position of said reels in response to detection of said first arrangement of drive means and enabling translation to said second relative position of said reels in response to detection of said second arrangement of drive means.

5. A tape cassette according to claim 4 wherein said detection means comprises means defining an aperture in said housing means for admitting said actuating member of said cassette player for cooperation with said reel-moving member and said lock means.

6. A tape cassette according to claim 5 wherein said lock means comprises a resilient lock member, and said reel-moving member being formed with an engaging step and said resilient lock member normally engaging said engaging step to lock said reel-moving member in a normal position corresponding to which said reels are in said first relative position and being moved upon cooperation with said actuating member of said cassette player away from said engaging step to enable said real-moving member to move said reels to said second relative position.

7. An 8-mm tape cassette for a cassette player, comprising:

housing means having at least a rear wall;
first and second reels;
means mounting said reels for rotation in said housing means about respective axes and for translation in said housing means between first and second positions;
a recording medium wound on said reels and extending therebetween for transport from one of said reels t the other;

said housing means being formed with an opening through which transducer means of a cassette player can gain access to said recording medium; and a reel-moving member inside said housing means for moving said reels from said first position to said second position upon cooperation with an actuating member of said cassette player;

said housing means having the shape of a rectangular parallelepiped measuring substantially 95 mm×63 mm×15 mm, and said axes being less than 26 mm from said rear wall in said second position of said reels, thereby providing, as compared to a standard 8-mm tape cassette having a rear wall and reels with respective axes each substantially 26 mm therefrom, an additional amount of space for accommodating said transducer means within said housing means in said second position of said reels for access to said recording medium.

8. An 8-mm tape cassette according to claim 7 wherein both of said axes are less than 26 mm from said rear wall.

9. A tape cassette having a front-to-back direction and a left-to-right direction for use in a cassette player and comprising:

housing means having an opening at a front side;
a pair of reels;
means for mounting said reels for rotation in said housing means and for translation in said housing between first and second positions; and
a reel-moving member inside said housing means for moving said reels from said first position to said second position upon cooperation with an actuating member of a cassette player;
said housing means being formed with a pair of reel shaft insertion holes spaced apart in the left-to-right direction and respectively cooperating with said reels, said reel shaft insertion holes being elongate in a direction having a component parallel to the front-to-back direction, thereby allowing repositioning of said reels to said second position in a direction having a component parallel to the front-to-back direction and increasing a size of said opening in said housing means.

10. A tape cassette according to claim 9 wherein both of said reel shaft insertion holes are elongate in the front-to-back direction.

11. A tape cassette for a cassette player, comprising:
housing means;
a pair of reels;
means mounting both of said reels for rotation and for translation in said housing means, so that said reels can assume either of first and second relative positions; and
a recording medium wound on said reels and extending therebetween for transport from one of said reels to the other;
said housing means being formed with an opening through which transducer means of a cassette player can gain access to said recording medium;
a reel-moving member inside said housing means for moving said pair of reels from said first position to said second position upon cooperation with an actuating member of said cassette player and increasing a size of said opening in said housing; and
said tape cassette being formed with tape detection means for detection of starting and finishing portions of said recording medium.

12. A tape cassette according to claim 11 wherein said tape detection means comprises means defining at least one aperture in said housing means for admitting a light beam so that it is capable of irradiating said recording medium when said such reels are in at least one of said relative positions.

13. A tape cassette according to claim 11 wherein said tape detection means comprises means defining at least two apertures in said housing means for admitting light.

* * * * *

UNITED STATES PATENT AND TRADEMARK OFFICE
CERTIFICATE OF CORRECTION

PATENT NO. : 5,214,547
DATED     : May 25, 1993
INVENTOR(S): Yoshio Kondo

It is certified that error appears in the above-indentified patent and that said Letters Patent is hereby corrected as shown below:

Col. 11, line 68, change "t" to --to--

Signed and Sealed this

Twenty-fifth Day of October, 1994

Attest:

BRUCE LEHMAN

Attesting Officer        Commissioner of Patents and Trademarks